United States Patent
Suzow et al.

(10) Patent No.: US 9,973,808 B2
(45) Date of Patent: May 15, 2018

(54) STREAMLINED VIEWING OF RECORDED PROGRAMS BASED ON MARKERS

(71) Applicant: The DIRECTV Group, Inc., El Segundo, CA (US)

(72) Inventors: Joseph S. Suzow, Burbank, CA (US); Carlos Rosado, Redondo Beach, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 85 days.

(21) Appl. No.: 14/589,831

(22) Filed: Jan. 5, 2015

(65) Prior Publication Data
US 2017/0013302 A1   Jan. 12, 2017

(51) Int. Cl.
*H04N 21/435* (2011.01)
*H04N 21/4147* (2011.01)
*H04N 21/472* (2011.01)
*H04N 21/858* (2011.01)
*H04N 21/81* (2011.01)

(52) U.S. Cl.
CPC ....... *H04N 21/435* (2013.01); *H04N 21/4147* (2013.01); *H04N 21/47217* (2013.01); *H04N 21/8133* (2013.01); *H04N 21/858* (2013.01)

(58) Field of Classification Search
CPC ......... H04N 21/4147; H04N 21/47217; H04N 21/6143; H04N 21/858
See application file for complete search history.

(56) References Cited

U.S. PATENT DOCUMENTS

| | | | | |
|---|---|---|---|---|
| 2002/0194595 A1* | 12/2002 | Miller | .................. | H04H 20/10 725/36 |
| 2005/0002647 A1* | 1/2005 | Girgensohn | ......... | G11B 27/034 386/243 |
| 2009/0210395 A1* | 8/2009 | Sedam | .................. | H04W 4/00 |
| 2010/0242072 A1* | 9/2010 | Bhagavath | ........... | H04N 21/235 725/94 |
| 2010/0254574 A1* | 10/2010 | Chien | ................ | G06K 9/00744 382/107 |
| 2013/0124461 A1* | 5/2013 | Dombrowski | .... | G06F 17/30038 707/610 |

* cited by examiner

*Primary Examiner* — Oleg Asanbayev
*Assistant Examiner* — Susan X Li
(74) *Attorney, Agent, or Firm* — Guntin & Gust, PLC; Joseph Peter Hrutka (57) ABSTRACT

A receiving system includes a communication input system to receive a program and a marker file. The program has a total duration when the program is presented in its entirety. The marker file includes a plurality of markers indicating locations of contents-of-interest in the program. The system includes a data storage system to store the program and the marker file. The system includes a user control to receive requests to present the contents-of-interest indicated by the plurality of markers. The system includes one or more processors to determine the locations of the contents-of-interest in the program from the plurality of markers. The system includes a presentation output interface to present the contents-of-interest on a user interface. The presentation of the contents-of-interest skips some content in the program. The contents-of-interest are presented over a shortened duration that is less that the total duration of the program when presented in its entirety.

17 Claims, 8 Drawing Sheets

STREAMLINED VIEWING OF RECORDED PROGRAMS BASED ON MARKERS

BACKGROUND

Cable and satellite television systems can transmit large volumes of programming over hundreds of channels. Such large volumes of programming enhance the likelihood that viewers will find programming that interests them. Many viewers, however, find it difficult to manage and select from the large number of programming choices available to them. For example, cable and satellite television systems can provide many channels devoted to sports programming. A viewer may be interested in watching several sporting events that are presented across these channels but may not be able to watch them all when they are initially broadcast. As such, current cable and satellite television systems may allow the viewer to record sporting events, e.g., via a digital video recorder (DVR), and to watch each sporting event at more convenient times.

SUMMARY

Although current cable and satellite television systems may allow consumers to record programs and view the programs at more convenient times, the duration of many programs may extend to several hours. Thus, even with the ability to record programs, watching long programs in their entirety may still not be practical. Recognizing that many programs may include dead time and content of less interest to audiences, example embodiments provide systems and methods to streamline the presentation of content in a program. In particular, segments containing content of greater interest in the program are identified and marked so that the audience can easily jump to these particular segments. By skipping over dead time and content of less interest, the audience can access the content of interest in the program without devoting the time necessary to watch or listen to the program in its entirety.

According to an example embodiment, a method for processing content in a program, includes receiving, via a communication input system, a program and storing the program on a data storage system as the program is received via the communication input system. The program has a total duration based on the program being presented on a user interface in the program's entirety. The method also includes receiving, via the communication input system, a marker file including a plurality of markers indicating respective locations of contents-of-interest in the program. In addition, the method includes storing the marker file on the data storage system. Furthermore, the method includes receiving, via a user control, requests to present the contents-of-interest indicated by the plurality of markers. In response to the requests to present the contents-of-interest, the method includes determining, with one or more processors, the locations of the contents-of-interest in the program from the plurality of markers in the marker file. In further response, the method also includes presenting, via a presentation output interface, the contents-of-interest on the user interface according to the plurality of markers in the marker file. Presenting the contents-of-interest skips some content in the program, and the contents-of-interest are presented over a shortened duration that is less that the total duration of the program as presented in the program's entirety.

According to another example embodiment, a receiving system for processing content in a program includes a communication input system configured to receive a program and a marker file. The program has a total duration based on the program being presented on a user interface in the program's entirety. The marker file includes a plurality of markers indicating locations of contents-of-interest in the program. The system also includes a data storage system configured to store the program as the program is received via the communication input system and to store the marker file. In addition, the system includes a user control configured to receive requests to present the contents-of-interest indicated by the plurality of markers in the marker file. Furthermore, the system includes one or more processors configured to determine the locations of the contents-of-interest in the program from the plurality of markers in the marker file. The system also includes a presentation output interface configured to present the contents-of-interest on the user interface according to the plurality of markers in the marker file. The presentation of the contents-of-interest skips some content in the program, and the contents-of-interest are presented over a shortened duration that is less that the total duration of the program as presented in the program's entirety.

According to a further example embodiment, a system for processing content in a program includes one or more content sources providing a program and a marker file. The program having a total duration based on the program being presented on a user interface in the program's entirety. The marker file includes a plurality of markers indicating locations of contents-of-interest in the program. The system also includes a receiving system configured to receive the program and the marker file from the one or more content sources. The receiving system includes a data storage system and one or more processors. The data storage system is configured to store the program and the marker file in a data storage system. The one or more processors is configured to determine the locations of the contents-of-interest in the program from the plurality of markers in the marker file. The receiving system presents, on the user interface, the contents-of-interest on a user interface according to the plurality of markers in the marker file. The presentation of the contents-of-interest skips some content in the program, and the contents-of-interest are presented over a shortened duration that is less that the total duration of the program as presented in the program's entirety.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Various embodiments are described herein with reference to the following drawings, in which like numerals denote like entities, and in which.

DETAILED DESCRIPTION

A. Overview

Although current cable and satellite television systems may allow consumers to record programming and view the programming at more convenient times, the duration of many programs may extend to several hours. Thus, even with the ability to record programs, watching long programs in their entirety may still not be practical.

For example, watching several recorded sporting events may require many hours to view. Some sporting events, such as baseball or football games, may extend beyond three hours. Even if a viewer can record baseball or football games for later viewing, the viewer must still find at least three hours to watch each game in its entirety. The availability of large volumes of sports programming on several channels worsens the viewer's dilemma as the viewer can record even more games.

According to recent media studies, only about eighteen minutes of actual game action takes place over the course of a three-hour MAJOR LEAGUE BASEBALL® (MLB®) game. Similarly, according to further studies, the average amount of time that the ball is actually in play during a typical NATIONAL FOOTBALL LEAGUE® (NFL®) game is only about eleven minutes. Thus, viewers generally devote more time than is necessary to watch the actual action in a baseball or football game.

Recognizing that televised sporting events and other types of programs may include dead time and content of less interest to audiences, example embodiments provide systems and methods to streamline the presentation of content in a program. In particular, segments containing content of greater interest in the program are identified and marked so that the audience can easily jump to these particular segments. By skipping over dead time and content of less interest, the audience can access the content of interest in the program without devoting the time necessary to watch or listen to the program in its entirety.

For instance, to make the viewing of recorded baseball or football games less time consuming and more convenient, example embodiments can streamline the viewing of recorded games by marking selected segments of content in the recorded games and allowing viewers to jump to these selected segments. The selected segments can be limited to parts of the game where actual game action and other content of interest (e.g., replays, in-game interviews, etc.) are involved. Thus, with a typical NFL® game or MLB® game, viewers can jump to actual game action and other content of interest throughout the recording and watch the game in less than thirty minutes.

Aspects of the present disclosure are not limited to streamlining the presentation of sporting events. In general, example embodiments can mark any type of program to allow audiences to skip over portions of a program and access selected segments that present content of greater interest.

As used herein, a program refers to a particular presentation of content delivered via any media, and content refers to any visual and/or audio subject matter within the program. Programs include, but are not limited to, sporting events, movies, shows made for network or cable television, news shows, live broadcast performances, music, radio shows, audio podcasts, user-generated videos, video blogs, educational videos, recorded lectures/seminars/speeches, audio books, etc. Content users (also referred to herein as audiences and viewers) can watch, listen to, and/or otherwise use content. When content is presented to content users, the content can be displayed visually and/or played aurally.

B. Example System(s) for Presenting Content

Figure 1:
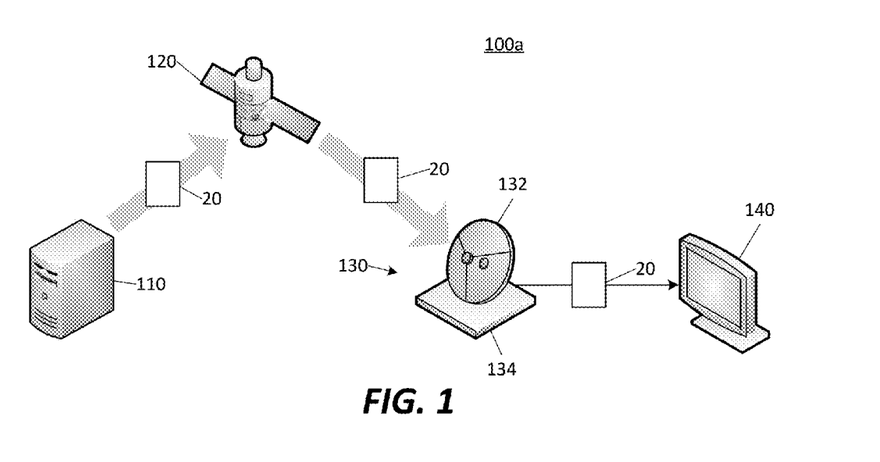
FIG. 1 illustrates an example system for presenting content to consumers according to aspects of the present disclosure.

FIG. 1 illustrates an example system 100*a* for presenting content according to aspects of the present disclosure. The example system 100*a* includes a content source 110 and a satellite transmission system 120. The content source 110 transmits television programming over a plurality of channels to the satellite transmission system 120, which in turn sends a satellite broadcast signal to viewers. In some cases, the viewers must be subscribers to a satellite television service associated with the content source 110 and the satellite transmission system 120.

The example system 100*a* also includes a receiving system 130 and a user interface 140. The receiving system 130 includes a satellite dish 132 and a set-top box 134. The satellite dish 132 receives the satellite broadcast signal from the satellite transmission system 120 and transmits the satellite broadcast signal to the set-top box 134 for further processing. Using the set-top box 134, viewers select any one of the channels provided via the satellite broadcast signal. The set-top box 134 converts the satellite broadcast signal into a form that is compatible with the user interface 140 and transmits content associated with the selected channel to the user interface 140.

The set-top box 134 provides a variety of features, such as a program guide and program search function, to help viewers select and manage content to be transmitted to the user interface 140. The set-top box 134 also includes a variety of connections (e.g., ports) for communicatively coupling the set-top box 134 to different types of user interfaces including the user interface 140. In addition, as described in further detail below, the set-top box 134 includes a recording feature, such as a digital video recorder (DVR), for recording content provided by the satellite broadcast signal and for viewing the content on the user interface 140 at a later time. The recording feature includes playback controls (e.g., play, pause, rewind, fast forward, etc.) for controlling the recorded content on the user interface 140. Such playback controls as well as other features of the set-top box 134 may be included on a remote control.

The user interface 140 may include a display to present visual aspects of content and one or more speakers to present audio aspects of the content. For example, the user interface 140 may include a television, a monitor, a home theater/entertainment system, projector/screen system, or the like.

While aspects of the present disclosure can be implemented with the example system 100a, it is understood that other systems for transmitting and receiving content may be employed. For example, rather than employing a satellite television system, the television programming can be transmitted through a cable television system. Alternatively, the television programming can be transmitted through local over-the-air television. Moreover, the content is not limited to television programming. Aspects of the present disclosure may also apply to content from any source and available for example through video-on-demand, online streaming, download from online sites, radio broadcasts, fixed storage media (e.g., DVD's, CD's, tapes, etc.), or the like.

As shown in FIG. 1, the content source 110 provides a program 20 on one of the channels transmitted via the satellite transmission system 120, and the set-top box 134 can transmit the program 20 to the user interface 140 as the satellite broadcast signal is being received. Additionally or alternatively, the set-top box 134 can record the program 20 as the satellite broadcast signal is being received and transmit the program to the user interface 140 from the recording at a later time.

Figure 2:
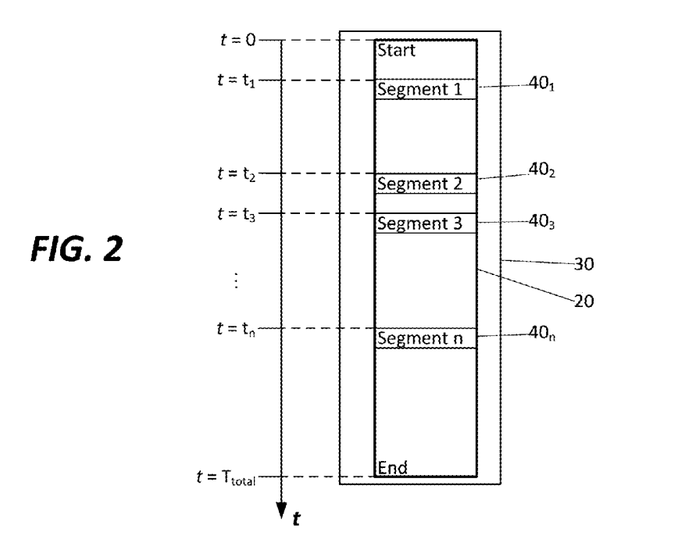
FIG. 2 illustrates a program, including content segments, that is presented through the example system of FIG. 1.

FIG. 2 illustrates the program 20, which is received by the set-top box 134 and also recorded in a program data file 30, e.g., via a DVR. The program 20 includes content segments $40_1, 40_2, 40_3, \ldots, 40_n$. In general, each content segment 40 contains some content of interest in the program 20. A timeline (t) is shown in FIG. 2 to indicate the elapsed presentation time for the program 20. When presented, the program 20 starts at time t=0. At time $t=t_1$, the content segment $40_1$ begins; at time $t=t_2$, the content segment $40_2$ begins; at time $t=t_3$, the content segment $40_3$ begins; and so on. Eventually, the content segment $40_n$ begins at time $t=t_n$. The entire program ends at time $t=T_{total}$. The content segments 40 may have different individual durations and the time intervals between the content segments 40 may vary.

The total duration of the program 20 is equal to $T_{total}$. Viewers, however, may find it inconvenient to watch the entire program 20 in its entirety. Accordingly, example embodiments allow viewers to skip over some content in the program and to jump directly to content of greater interest in the selected segments $40_{1-n}$. The selected content segments $40_{1-n}$ can be viewed in less than the time $T_{total}$ required to watch the entire program 20.

C. Example Embodiment(s) for Marking Selected Content Segments

Figure 3:
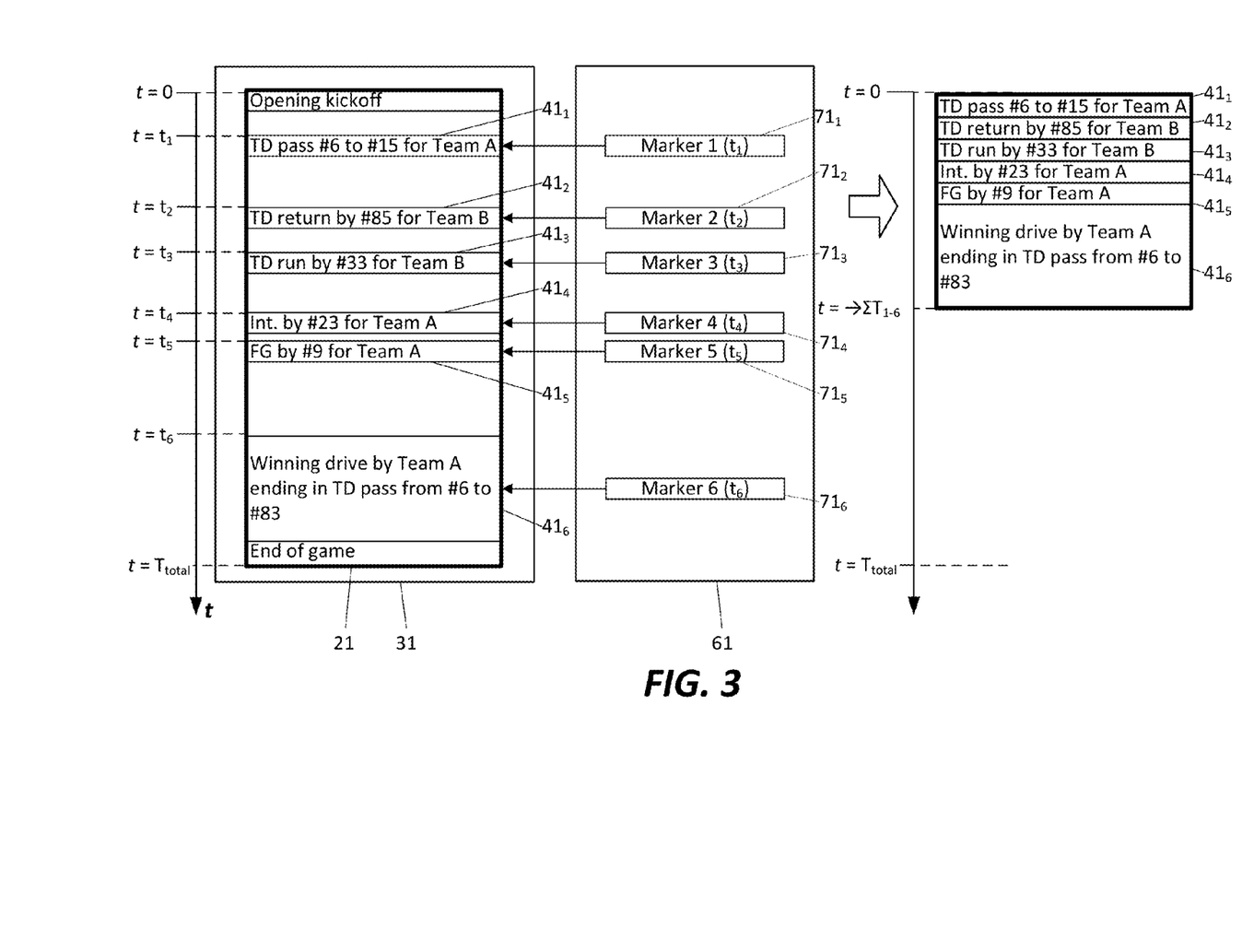
FIG. 3 illustrates an example approach for generating a marker file identifying selected content from a program, according to aspects of the present disclosure.

FIG. 3 illustrates an example program data file 31 that includes a recording of an example program 21, i.e., a television broadcast of an entire football game. The program 21, for instance, may be recorded by the set-top box 134. The program 21 includes content segments $41_{1-6}$ which present content of more interest to the viewers. For instance, the content segments $41_{1-6}$ present game action that is important to the outcome of the football game. Meanwhile, the other portions of the program 21 not identified in FIG. 3 include dead time or content of less interest to viewers (e.g., less significant game action).

A timeline (t) is shown in FIG. 3 to indicate the elapsed presentation time for the program 21. The start of the football game starts at time t=0 with the Opening Kickoff. At time $t=t_1$, the content segment $41_1$ includes a Touchdown Pass from Player Number 6 to Player Number 15 for Team A. At time $t=t_2$, the content segment $41_2$ includes a Touchdown Kickoff Return by Player Number 85 for Team B. At time $t=t_3$, the content segment $41_3$ includes a Touchdown Run by Player Number 33 for Team B. At time $t=t_4$, the content segment $41_4$ includes an Interception by Player Number 23 for Team A. At time $t=t_5$, the content segment $41_5$ includes a Field Goal by Player Number 9 for Team A. At time $t=t_6$, the content segment $41_6$ includes the Winning Drive by Team A with a Touchdown Pass from Player Number 6 to Player Number 83. The football game ends at time $t=T_{total}$. As FIG. 3 illustrates, content segments can include different types of subject matter.

Watching the selected content segments $41_{1-6}$ rather than the entire program 21 streamlines the viewing of the football game. FIG. 3 illustrates an example approach for marking the selected content segments $41_{1-6}$ so that the viewer can jump to them directly. As described above, the program data file 31 includes a recording of the program 21. According to aspects of the present disclosure, a separate marker file 61 is created to indicate which segments in the program 21 include content of interest. The marker file 61 includes markers $71_{1-6}$ (also known as bookmarks) that refer to respective selected content segments $41_{1-6}$ of the program 21. According to one approach, the marker $71_1$ identifies the content segment $41_1$ by specifying the start of the content segment $41_1$ at time $t=t_1$; the marker $71_2$ identifies the content segment $41_2$ by specifying the start of the content segment $41_2$ at time $t=t_2$; the marker $71_3$ identifies the content segment $41_3$ by specifying the start of the content segment $41_3$ at time $t=t_3$; the marker $71_4$ identifies the content segment $41_4$ by specifying the start of the content segment $41_4$ at time $t=t_4$; the marker $71_5$ identifies the content segment $41_5$ by specifying the start of the content segment $41_5$ at time $t=t_5$; and the marker $71_6$ identifies the content segment $41_6$ by specifying the start of the content segment $41_6$ at time $t=t_6$.

The presentation of the program 21 can be streamlined by jumping to the start times $t=t_{1-6}$ specified by the markers $71_{1-6}$ in the marker file 62 and watching the respective content segments $41_{1-6}$ instead of the entire program 21. The duration of the content segment $41_1$ is $T_1$; the duration of the content segment $41_2$ is $T_2$; the duration of the content segment $41_3$ is $T_3$; the duration of the content segment $41_4$ is $T_4$; the duration of the content segment $41_5$ is $T_5$; and the duration of the content segment $41_6$ is $T_6$. Thus, the amount of time required watch only the content segments $41_{1-6}$ according to the marker file 61 is $\Sigma T_{1-6}$. As shown in FIG. 3, $\Sigma T_{1-6}$ is less than the duration $T_{total}$ of the entire program 21. Accordingly, viewers can conveniently watch the football game in a more streamlined format.

As described above, the recording feature of the set-top box 134 includes playback controls (e.g., play, pause, rewind, fast forward, etc.) for controlling recorded content on the user interface 140. In example embodiments, an additional control may be provided through the set-top box 134, e.g., via remote control, to allow viewers to jump instantaneously to the start of each content segment as specified by the marker file and allowing some content to be completely skipped. Unlike the use of the fast forward playback control which presents the content of the program 21 at greater speeds, the additional control allows viewers to jump completely over content in the program 21 to the start of the next content segment specified by the marker file without requiring the viewers to view any of the skipped content on the user interface 140. Although the fast forward playback control may allow viewers to pass through content of lesser interest at greater speeds, the content is still inconveniently shown on the user interface 140 and the viewers must still devote time to viewing the content of lesser interest. Moreover, even with the fast forward playback control, viewers must manually identify the start of content of interest each time they view the program 21. Indeed, viewers often miss the start of such content and may need to use the rewind playback control to queue the playback at the desired start. Advantageously, the marker file 61 provides predetermined markers that already identify the start of content of interest prior to viewing, so that viewers can automatically and conveniently skip to the predetermined start of the content segments 41 during playback.

FIG. 3 provides just one example of the types of content segments that can be marked for viewing. In alternative examples, the content segments 41 selected from the program 21 can be expanded to include all plays from the football game. As such, the markers 71 in the corresponding marker file 61 can specify the start time for each snap of the football. By using the markers 71 to skip immediately from the end of one play to the start of the next play, viewers can watch the actual game action of the football game in generally less than thirty minutes as described above. In addition, the content segments 41 selected from the program 21 may be further expanded to include other content, such as replays, in-game interviews, analysis, etc., provided during the program 21. In one example, the markers 71 may allow viewers to jump to the end of commercial breaks to watch all coverage of the game without commercials.

In yet other alternative examples, the content segments selected from the program 21 may include plays made by one or more particular players on the teams in the football game. For example, as shown in FIG. 3, the content segments 41$_1$ and 41$_6$ include Touchdown Passes made by Player Number 6. Content segments involving particular players, such as Player Number 6, may be of interest to fantasy sports fans who have fantasy teams with those particular players. Markers can allow viewers to jump exclusively to plays involving players on a particular fantasy team. By reducing the amount of time required to see all the game action in a football game, fantasy sports fans can watch more football games without devoting three or more hours to each game.

Accordingly, because the program 21 may include different types of content that may be of interest to different viewers, more than one marker file can be provided for the program 21 to mark different types of content segments for streamlined viewing. For example, when selecting a recorded program for viewing, viewers can correspondingly select, via controls of the set-top box 134, a particular marker file that includes a specific set of markers that allow the viewers to skip to certain selected content, e.g., all game action involving both teams, highlight plays involving one of the teams, or plays involving players on a particular fantasy team, etc.

Figure 4:
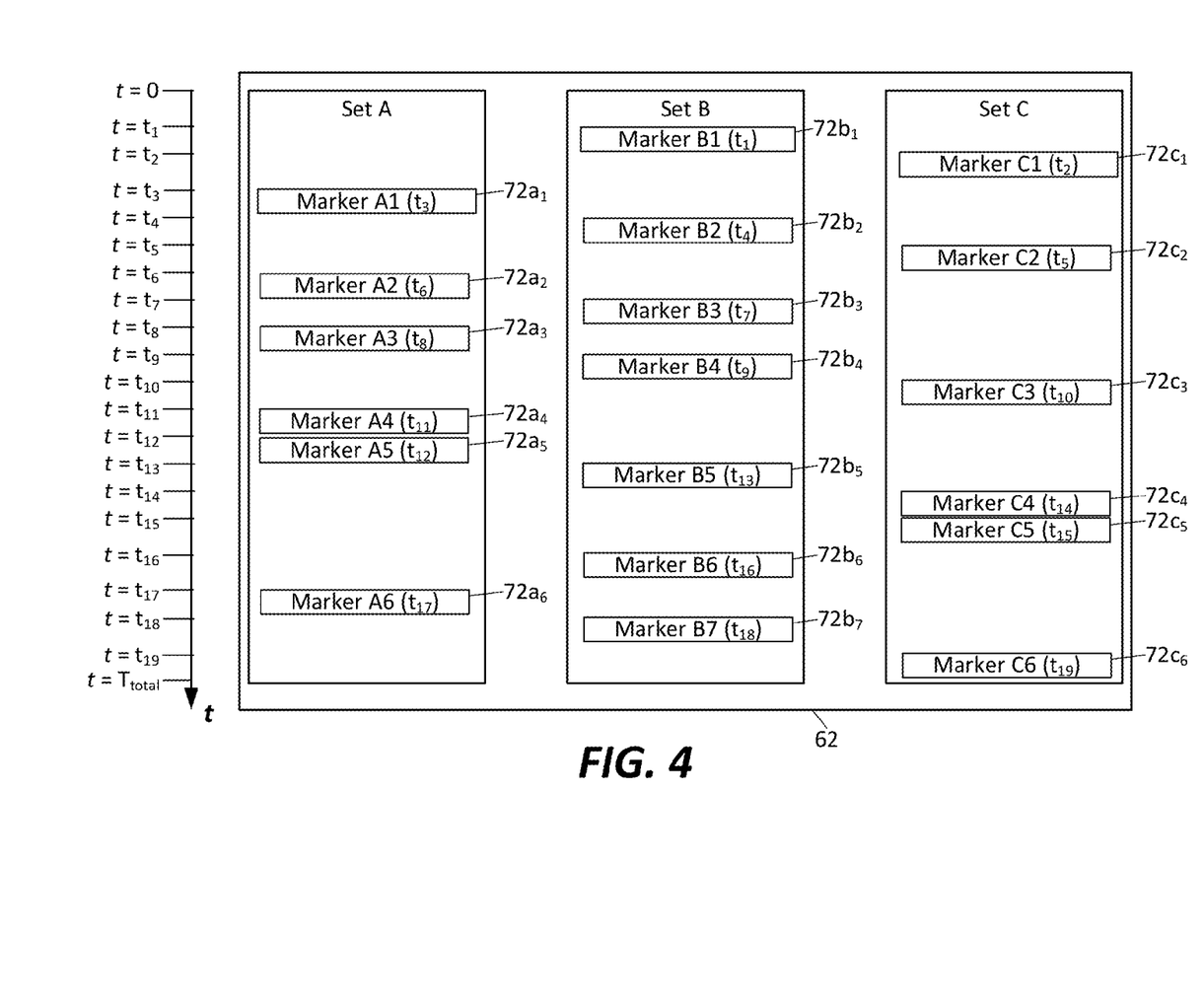
FIG. 4 illustrates an example marker file identifying multiple sets of selected content from a program, according to aspects of the present disclosure.

Alternatively, as shown in FIG. 4, a single marker file 62 may include more than one set of markers 72, which viewers can select for viewing a corresponding recorded program. In particular, the marker file 62 includes three sets A, B, and C of markers 72. The marker set A includes markers 72$a_{1-6}$; the marker set B includes markers 72$b_{1-7}$; and the marker set C includes markers 72$c_{1-6}$. A viewer can select, via controls of the set-top box 134, one of the marker sets A, B, or C to watch the program with the corresponding set of markers 72. In some embodiments, the viewer may switch from one marker set to another in order to use a different set of markers 72 during streamlined presentation of the program.

Figure 5:
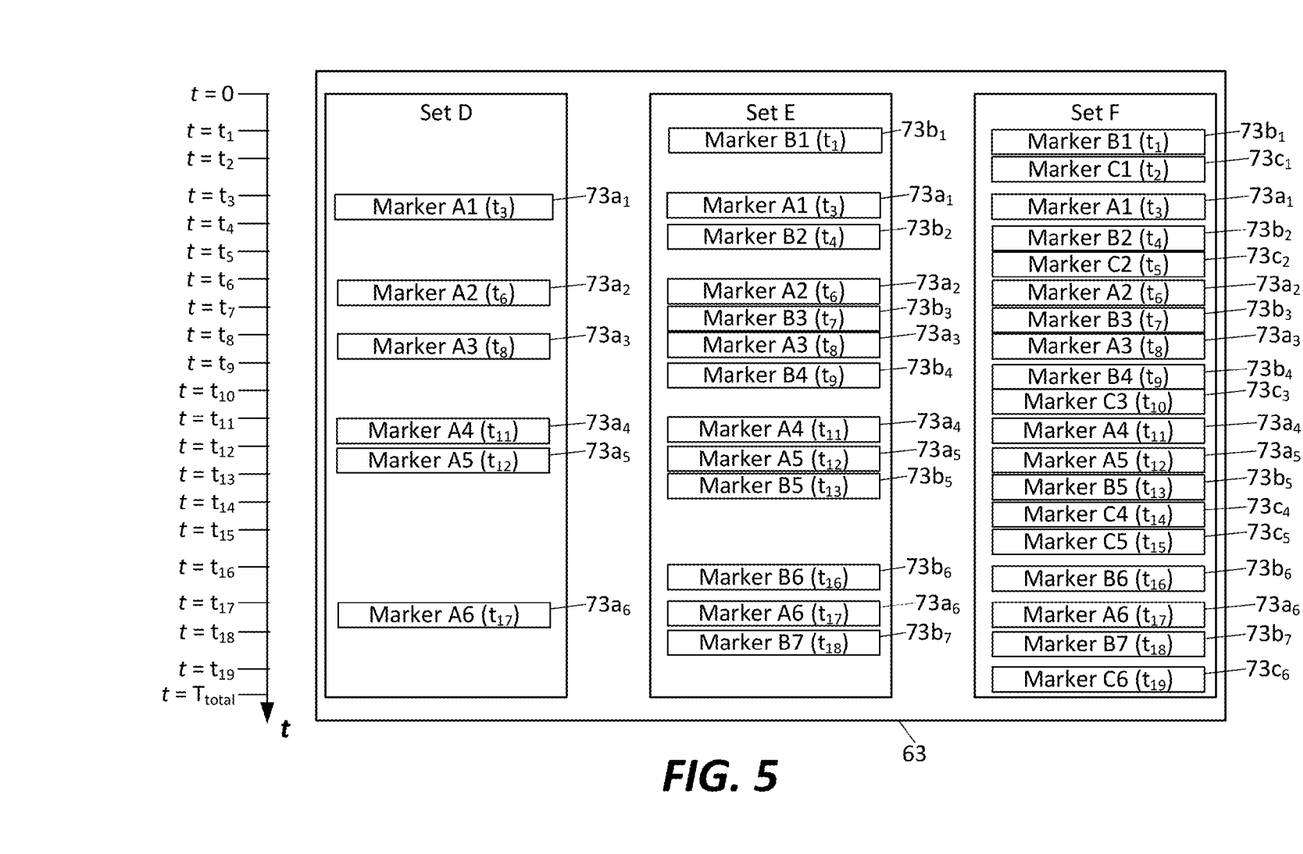
FIG. 5 illustrates another example marker file identifying multiple sets of selected content from a program, according to aspects of the present disclosure.

A marker file 63 shown in FIG. 5 includes three sets D, E, and F of markers 73, which a viewer can select for viewing a corresponding recorded program. The marker set D includes markers 73$a_{1-6}$; the marker set E includes markers 73$b_{1-7}$ as well as the markers 73$a_{1-6}$ of the marker set D; and the marker set F includes markers 73$c_{1-6}$ as well as the markers 73$a_{1-6}$ of the marker set D and markers 73$b_{1-7}$ of the marker set E. The viewer may switch from one marker set to another in order to skip to different sets of content of interest identified by the markers 73. Switching from the marker set D to the marker set E, the viewer can skip to content identified by the markers 73$b_{1-7}$ in addition to the markers 73$a_{1-6}$ of the marker set D. Switching from the marker set E to the marker set F, the viewer can skip to even more content identified by the markers 73$c_{1-6}$ in addition to the markers 73$a_{1-6}$ of the marker set D and the markers 73$c_{1-6}$ of the marker set E. Thus, in some embodiments, the three marker sets D, E, and F provide varying levels of selected content. Marker set F presents a greater level of content than the marker set E, and the marker set E presents a greater level of content than the marker set D. Each successive marker set, i.e., from the marker set D to the marker set F, provides additional markers 73 identifying additional content of interest in a cumulative manner. The amount of time required to watch a program may vary according to the selected marker set(s). For example, the amount of time to watch the program may be greater with the marker set F than with the marker set E, or greater with the marker set E than the marker set D.

Figure 6:
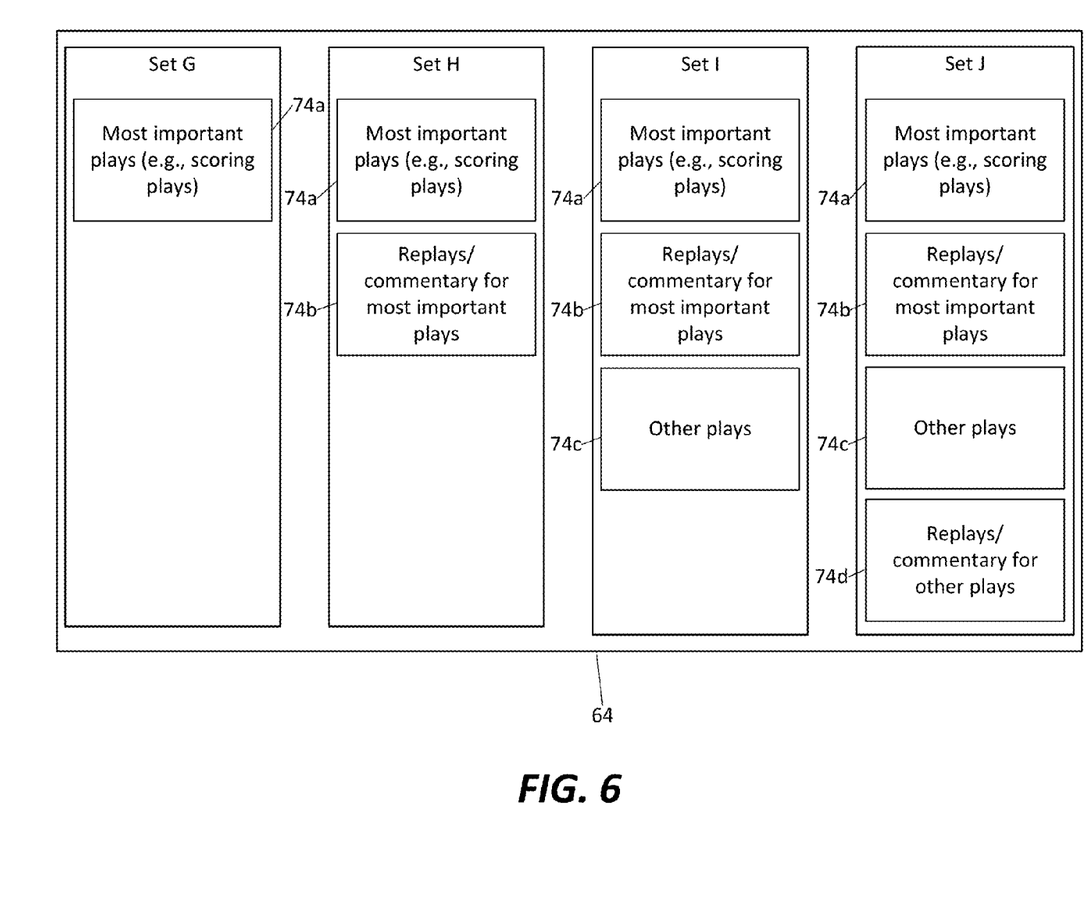
FIG. 6 illustrates yet another example marker file identifying multiple sets of selected content from a program, according to aspects of the present disclosure.

In one example, a marker file 64 shown in FIG. 6 includes a marker set G with markers 74$a$ that allow the viewer to skip to the most important game action (e.g., scoring plays) in a football game. The viewer can select a marker set H with markers 74$b$ that allow the viewer to skip to additional content of interest, i.e., replays and commentary for the most important game action identified by the marker set G. The viewer can also select a marker set I with markers 74$c$ that allow the viewer to skip to more additional content of interest, i.e., the remaining game action in the football game. Moreover, the viewer can select a marker set J with markers 74$d$ that allow the viewer to skip to even more additional content of interest, i.e., replays and commentary for the remaining game action identified by the marker set I. Each successive marker set, i.e., from the marker set G to the marker set J, provides additional markers 74 identifying additional content of interest in a cumulative manner. In effect, the different marker sets provide different levels of granularity for streamlining the presentation of the recorded football game, where the marker set G provides the lowest level of granularity and the marker set J provides the greatest level of granularity. The amount of time to watch the program may increase as the viewer moves from the marker set G to the marker set J. The viewer can switch, e.g., via controls of the set-top box 134, between the different marker sets as the recorded program is presented in order to watch different levels of granularity during the presentation.

Although the marker file 62 shown in FIG. 4 and the marker file 63 shown in FIG. 5 may include three sets of markers and the marker file 64 shown in FIG. 6 may include four sets of markers, it is understood that example embodiments may include any number of selectable sets of markers to identify different types of content of interest. In addition, it is also understood that two or more marker sets in a marker file may have any number and combination of markers in common.

The approach shown in FIG. 3, for example, can be more generally employed to direct viewers efficiently to selected content segments from any recorded program. For example, baseball games may be recorded and the marked content segments for the baseball game may include each pitch and associated play. The markers in the corresponding marker file for the recorded baseball game may specify the start time of each pitch. As described above, by using the markers to skip to actual game action, viewers can watch the baseball game in generally less than thirty minutes.

In another example, tennis matches may be recorded and the marked content segments may include each serve and associated rally. The markers in the corresponding marker file for the recorded tennis match may specify the start time of each serve.

In yet another example, golf matches may be recorded and the marked content segments may include each shot. The markers in the corresponding marker file for the recorded golf match may specify the start time of each shot. In some cases, the selected content segments may even be limited to one or more particular players in the match.

In a further example, any sport that employs a game clock (e.g., basketball, hockey) may be recorded and selected content segments may include all game action that takes place as the clock is winding down. The markers in the corresponding marker file for such recorded games may specify the start time of each instance the game clock begins to wind down.

Figure 7:
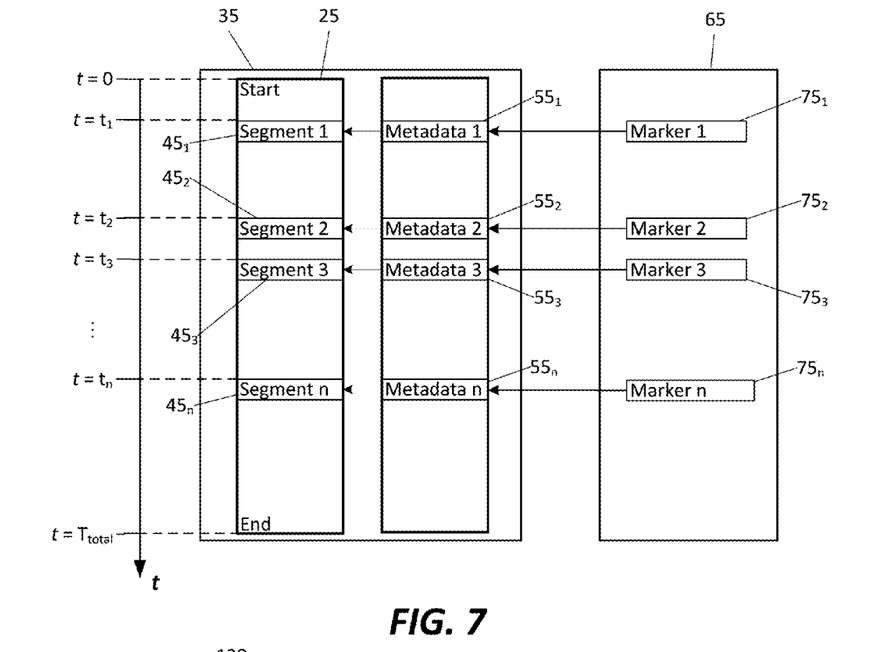
FIG. 7 illustrates an example program data file that includes metadata for a recorded program, according to aspects of the present disclosure.

Referring to FIG. 7, an example program data file 35 includes metadata for a recorded program 25. The metadata includes information that can be employed in markers $75_{1-n}$ which identify selected content segments $45_{1-n}$ in the program 25, respectively. For example, the metadata includes information relating to the elapsed time of the program 25. As such, the markers $75_1$, can specify a start time $t=t_{1-n}$ for the content segments $45_1$, and the elapsed time information in metadata $55_{1-n}$ can be used to locate the data for content segments $45_{1-n}$, respectively. In general, metadata in a program data file can be employed to correlate or align the identifying information provided by markers in a marker file to the data for the selected content segments in the program data file.

D. Example System(s) for Presenting Selected Content Based on Marker File

Figure 8:
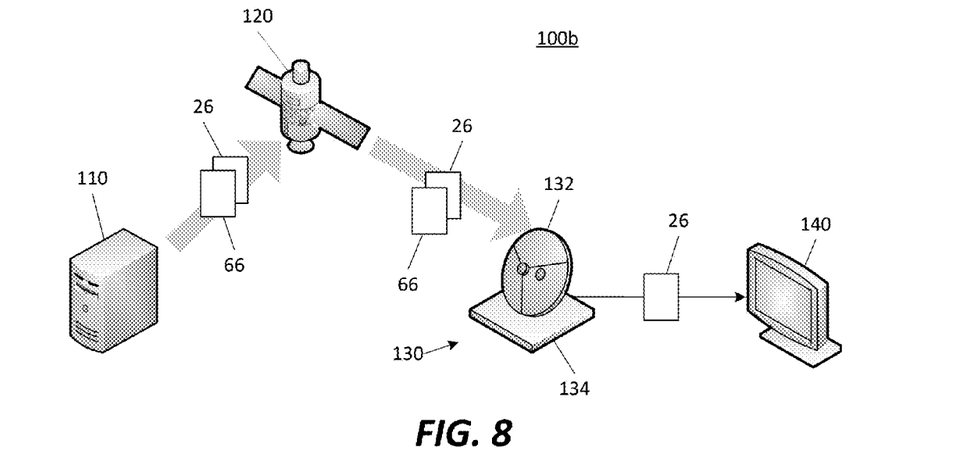
FIG. 8 illustrates an example system for presenting selected content from a program specified by markers in a marker file, according to aspects of the present disclosure.

FIG. 8 illustrates an example system 100b for presenting selected content segments from a program 26 specified by markers in a marker file 66. The example system 100b includes the content source 110 and the satellite transmission system 120. The content source 110 provides the program 26 on one of a plurality of channels for television programming. As shown in FIG. 8, the content source 110 also provides the marker file 66. The satellite transmission system 120 is employed to transmit the program 26 as well as the marker file 66 to the receiving system 130.

The receiving system 130 includes the satellite dish 132 and the set-top box 134. The satellite dish 132 receives the satellite broadcast signal from the satellite transmission system 120 and transmits the program 26 and the marker file 66 to the set-top box 134. The set-top box 134 can transmit the program 26 to the user interface 140 as the satellite broadcast signal is being received. Additionally or alternatively, the set-top box 134 can record the program 26, e.g., via DVR, as the satellite broadcast signal is being received and transmit the program 26 to the user interface 140 at a later time. The presentation of the program 26 can be streamlined by watching selected content segments identified by the marker file 66. In particular, the set-top box 134 integrates or correlates the marker information in the marker file 66 with the recorded program 26. As described above, the marker information can be aligned with the recorded program 26 by using metadata associated with the recorded program 26. During presentation of the recorded program 26 on the user interface 140, viewers can operate a control of the set-top box 134, e.g., via remote control, to jump instantaneously to the content segments specified by the marker information. In some embodiments, as described above, viewers can also operate a control of the set-top box 134 to select the marker file 66 from a plurality of available marker files, or to select a marker set from a plurality of marker sets in the marker file 66.

In the example system 100b, the marker file 66 comes from the content source 110, which also provides the television programming that includes the program 26. As such, the marker file 66 may be generated by the same organization that provides the television programming, i.e., the same satellite television service. In particular, employees of the organization can view the program 26 and select the content segments that are marked by the marker file 66. In some embodiments, the marker file 66 can be requested and retrieved separately from the content source 110 in a manner similar to video-on-demand.

In some cases, a viewer first records the program 26 on the set-top box 134 in its entirety before receiving the marker file 66. For example, if the program 26 is a live event or a broadcast premiere, the marker file 66 for the entire program 26 cannot be completely written until the broadcast of the program 26 is finished and the entire program 26 has been made available to identify and mark all content of interest. As such, the marker file 66 might not be available until after the broadcast of the program 26 is completed.

In other cases, one or more marker files 66 may be available before the broadcast of the program 26 has been completed. In particular, one or more marker files 66 may be provided for streamlined viewing of a recorded portion of a program 26 that is still being broadcast. A viewer can record the program 26 on the set-top box 134 as it is being broadcast and then begin watching the running recording of the program 26 before the broadcast of the program 26 is finished. For example, the viewer can begin watching a three-hour program 26 after the set-top box 134 has recorded the first hour. Embodiments can generate marker files 66 for portions of the program 26 that have already been recorded and transmit these marker files 66 to the set-top box 134 to allow streamlined viewing of these recorded portions even before the entire program 26 has been completely transmitted to the set-top box 134.

If the viewer starts watching a three-hour program 26 after one hour has been recorded on the set-top box 134, the viewer may receive a first marker file 66 that provides markers for the first hour of the program 26. Once the viewer has watched the first hour using the markers in the first marker file 66, the viewer may receive a second marker file 66 that provides additional markers for portions of the program 26 that were further recorded after the first hour. The viewer may receive more marker files 66 for additional recorded portions until the viewer has reached the end of the recorded program 26 or until the viewer catches up with the real time broadcast of the program 26. Preferably, the marker files 66 can be generated with sufficient frequency to stay ahead of the streamlined presentation of the program 26 so that the viewer does not run through all the markers before reaching the end of the program 26. In general, a series of marker files 66 may be provided for varying intervals of the program 26, e.g., a first marker 66 file for the first hour of the program 26, a second marker file 66 for the next 20 minutes, a third marker file 66 for the next 10 minutes, and so on.

Alternatively, a single marker file 66 may be provided as the viewer watches the running recording of the program 26, where markers are written to, and read from, the single marker file 66 as the program 26 is being broadcast. In other words, a running marker file 66 is broadcast to the receiving system 130 with the program 26, and the viewer accesses markers in the running marker file 66 as the viewer watches the running recording of the program 26. The presentation of the program 26 can be streamlined with the running marker file 66 until the viewer has watched the complete recorded program 26 or until the viewer catches up with the real time broadcast of the program 26.

In other cases, the program 26 and the marker file 66 can be transmitted to the receiving system 130 at the same time. For example, in contrast to a live event or broadcast premiere, embodiments may transmit a program 26 that has been previously released or broadcast and has already been made available to identify and mark all content of interest. As such, the corresponding marker file 66 can be completed in advance and made available at the time that the program 26 is transmitted to the receiving system 130. Even though the marker file 66 may be available at the time of transmission of the program 26, the marker file 66 can selectively be transmitted to the receiving system 130 at a different time.

In general, one or more marker files may be provided at any time to allow streamlined presentation of any recorded portion of a program regardless of whether the program has been completely broadcast or transmitted to the receiving system 130.

In some cases, the marker file 66 allows a viewer to skip over advertising that is presented during the broadcast of the program 26 over a television channel. It is noted that the advertising that appears during the initial broadcast of the program 26 is not affected if the marker file 66 is not available until after the broadcast of the program 26 is complete. In this case, the marker file 66 only allows the viewer to skip the advertising during playback of the recorded program 26. To generate advertising revenue for playback of the recorded program 26, other advertising may be presented in association with streamlined playback using the marker file 66, e.g., before, during, and/or after streamlined playback. Additionally or alternatively, a payment may be required when the marker file 66 is requested.

Figure 9:
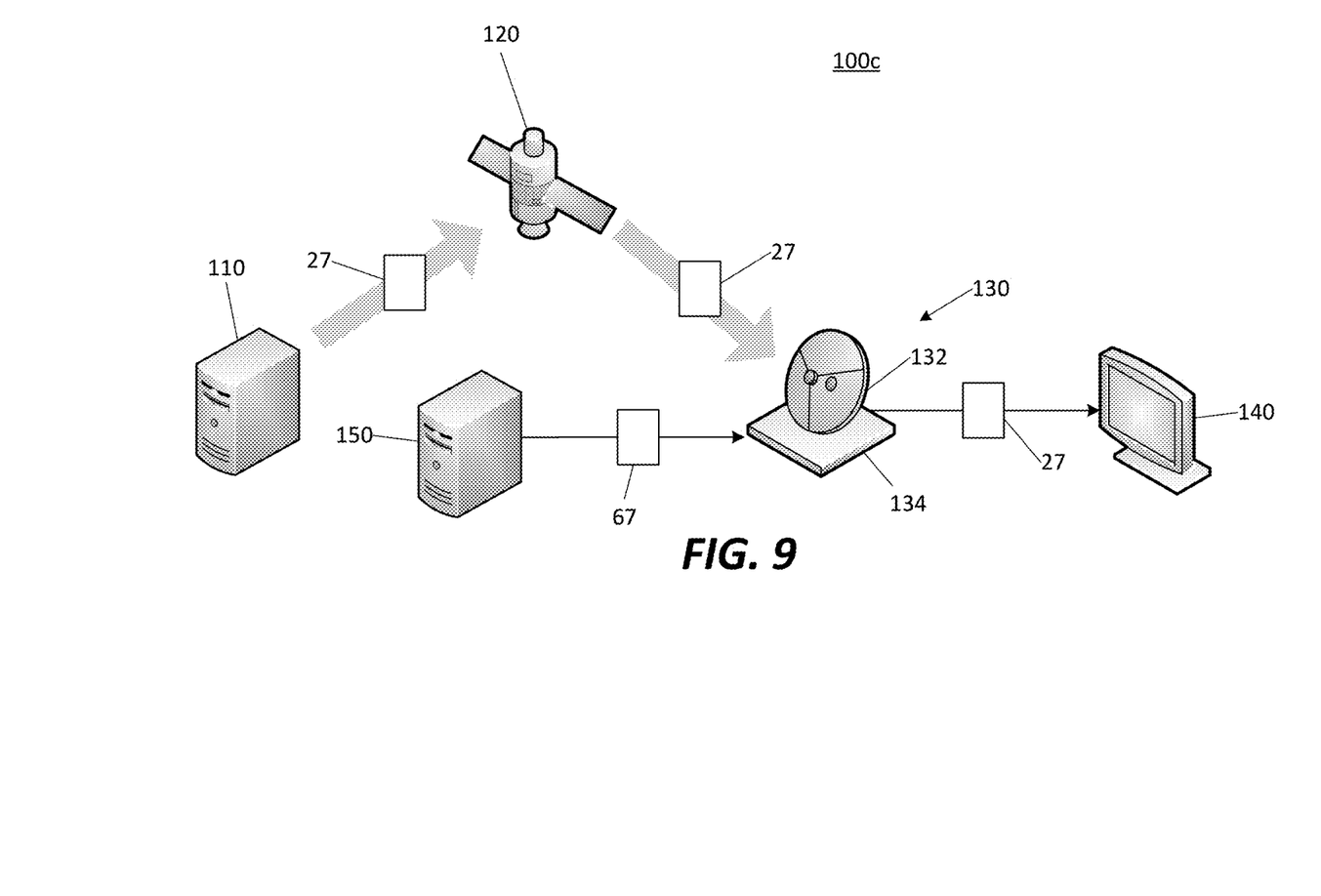
FIG. 9 illustrates another example system for presenting selected content from a program specified by markers in a marker file, according to aspects of the present disclosure.

Additionally or alternatively, as shown in FIG. 9, a marker file 67 in an example system 100c may come from another content source 150, such as an application store or an Internet download site. In some embodiments, the marker file 67 may also be generated by the same organization that provides the television programming, but the marker file 67 may be provided over another network rather than the satellite transmission system 120.

Additionally or alternatively, viewers may be able to generate their own marker files through controls of the set-top box. For example, the set-top box may have a "Set Marker" control that the viewers can activate when they are watching a program. Each activation of the "Set Marker" control writes a marker to a corresponding marker file, which is stored on the set-top box and can be used to skip to the selected content segment during subsequent presentations of the program. In some embodiments, the "Set Marker" control may specify a point a few seconds earlier in the playback, e.g., five seconds, so that when a viewer decides a marker is desired for content starting within the last few seconds, the viewer does not need to rewind the program to set the marker. In further embodiments, viewers may be able to share the marker files they create with others who are interested in similar selected content segments in the program. Such user-created marker files may be shared through the same organization/service that provides the program. Additionally or alternatively, online social communities can be established for the exchange of marker files.

Figure 10:
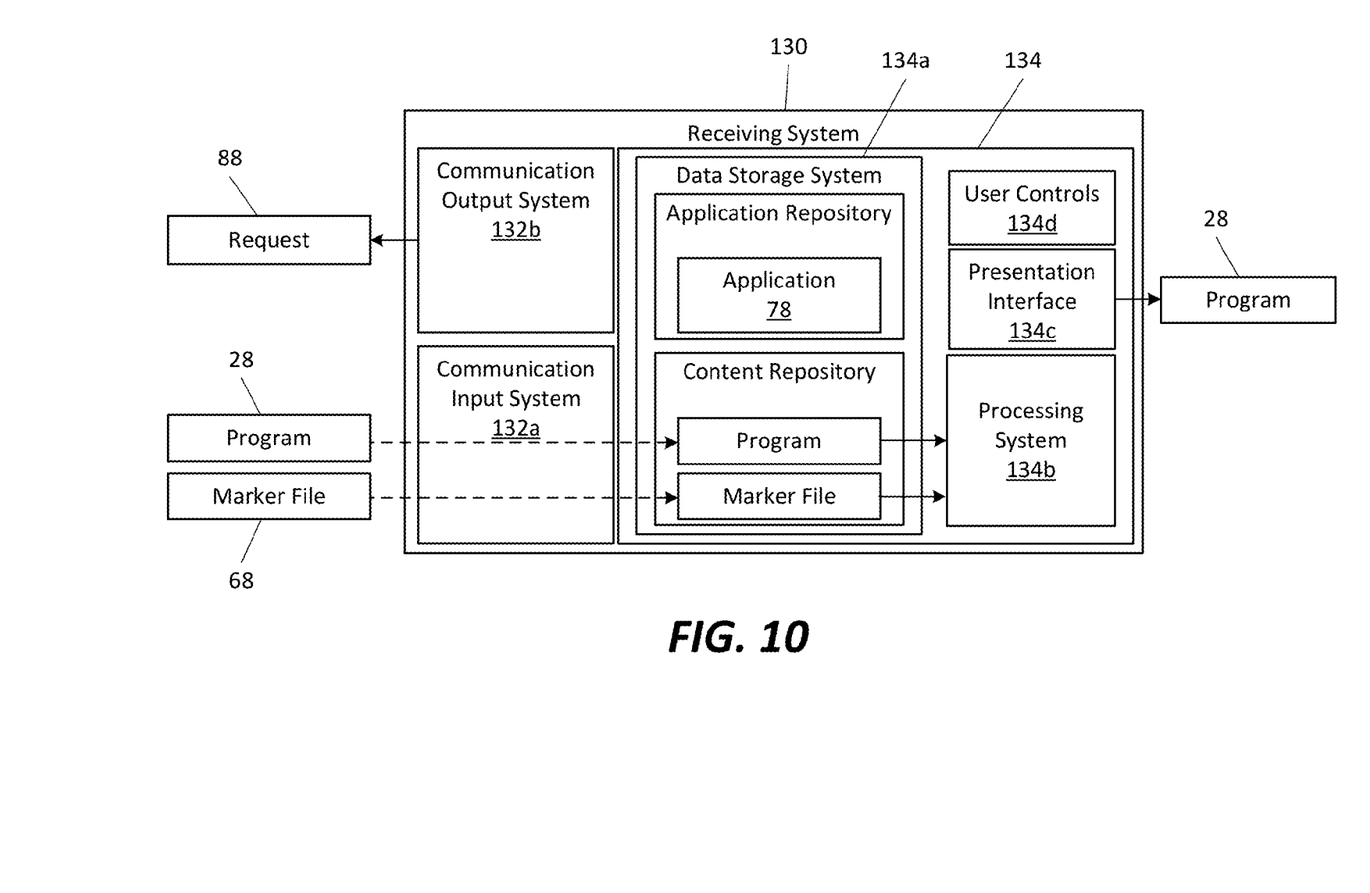
FIG. 10 illustrates an example receiving system for presenting selected content segments specified by markers in a marker file, according to aspects of the present disclosure.

FIG. 10 illustrates an example of the receiving system 130 for presenting selected content segments specified by markers in a marker file, according to aspects of the present disclosure. The receiving system 130 includes a communication input system 132a. The communication input system 132a may include a satellite dish as described above, a connection port for wired communication with external systems, and/or another type of device (e.g., antenna) for wireless communication with external systems. The receiving system 130 also includes a data storage system 134a, which may include any combination of computer-readable memory devices. The data stored physically on the data storage system 134a may be organized into a content repository and an application repository. Additionally, the receiving system 130 includes a processing system 134b, which may include one or more computer processors. In some embodiments, the data storage system 134a and the processing system 134b may be combined in a single device, such as the set-top box 134 as described above.

The receiving system 130 also includes a presentation output interface 134c that can be coupled to one or more user interfaces according to wired and/or wireless connections to present the program 28. Furthermore, the receiving system 130 includes user-operated controls 134d that control the operation of the receiving system 130, including controls for selecting, receiving, and using the marker file 68 for streamlined presentation of the program 28. Additionally, the receiving system 130 includes a communication output system 132b for communicating with external systems, e.g., to send a request 88 for the marker file 68 for the recorded program 28.

As FIG. 10 illustrates, the receiving system 130 receives a program 28 and a marker file 68 via the communication input system 132a and stores the program 28 and the marker file 68 in the content repository. Storage in the content repository may correspond with DVR functionality. When the program 28 is recorded, it remains available in the content repository for later viewing. In some examples, the marker file 68 may only include data for markers that identify content segments, e.g., by start times, and so the marker file 68 can be relatively small in size and easily retrieved. The marker file 68 can be transmitted and stored by the receiving system 130 automatically or when a specific request for the marker file 68 is made.

The application repository stores application software 78 for the processing system 134b. In particular, the processing system 134b reads instructions provided by the application software 78 to integrate the recorded program 28 with the marker information in the marker file 68. When the recorded program 28 is transmitted to the user interface, the viewer can select one of the controls 134d to jump instantaneously to the content segments specified by the marker information. Upon the viewer's command, the processing system 134b determines the next marker in the marker file 68, locates the start of the corresponding content segment in the program 28 based on the marker, and immediately presents the corresponding content segment on the user interface skipping over any intermediate content. The program 28 is shown continuously from the start of that content segment until the viewer decides to jump to the next content segment specified in the marker file 68.

E. Conclusion

In view of the foregoing, example embodiments provide systems and methods to streamline the presentation of content in a program. In particular, segments containing content of greater interest in the program are identified and marked so that the audience can easily jump to these particular segments. By skipping over dead time and content of less interest, the audience can access the content of interest in the program without devoting the time necessary to watch or listen to the program in its entirety.

The embodiments described herein may employ various computing systems for processing information and controlling aspects transmitting, receiving, and presenting content. The processor(s) of a computing system may be implemented as a combination of hardware and software elements. The hardware elements may include combinations of operatively coupled hardware components, including microprocessors, communication/networking interfaces, memory, signal filters, circuitry, etc. The processors may be configured to perform operations specified by the software elements, e.g., computer-executable code stored on computer readable medium. The processors may be implemented in any device, system, or subsystem to provide functionality and operation according to the present disclosure. The processors may be implemented in any number of physical devices/machines. Indeed, parts of the processing of the example embodiments can be distributed over any combination of processors for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media, the computing systems may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors may include, or be otherwise combined with, computer-readable media. Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

In the foregoing detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for processing content in a program, the method comprising:
  receiving, via a communication input system comprising a processor, a program, the program having a total duration based on the program being presented on a user interface in an entirety of the program;
  storing, via the communication input system, the program on a data storage system as the program is received via the communication input system, wherein the program is stored in a program data file including metadata, and wherein the metadata provides an elapsed time from a beginning of the program;
  receiving, via the communication input system, marker files including a plurality of marker sets for the program, each marker set including a respective plurality of markers indicating respective locations of contents-of-interest in the program, wherein each marker of the plurality of markers refers to the elapsed time marking a start of respective content of interest in the program, wherein the contents-of-interest include a first action of a first actor displayed in video images in the program and a second action of a second actor displayed in video images in the program, wherein the second action is a response to the first action in a previous contents-of-interest location in the program, and wherein the respective plurality of markers in each marker set provides information relating to the metadata corresponding to the contents-of-interest;

storing, via the communication input system, the marker files on the data storage system;

receiving, via user controls, a selection of one of the plurality of marker sets for the program as a selected marker set;

receiving, via the user controls, requests to present the contents-of-interest indicated by the respective plurality of markers in the selection; and in response to the requests to present the contents-of-interest:

determining the locations of the contents-of-interest in the program from the respective plurality of markers in the selected marker set; and presenting, via a presentation output interface, the contents-of-interest on the user interface according to the respective plurality of markers in the selected marker set, wherein presenting the contents-of-interest skips some content in the program, and the contents-of-interest are presented over a shortened duration that is less that the total duration of the program as presented in the entirety of the program, wherein presenting the contents-of-interest includes locating the contents-of-interest in the program data file according to the information relating to the metadata and reading the contents-of-interest from the program data file for presentation on the user interface.

2. The method of claim 1, further comprising transmitting, via a communication output system comprising a processor, a request for the marker files, wherein receiving the marker files occurs in response to transmitting the request.

3. The method of claim 1, wherein the contents-of-interest include visual content, and wherein the method further comprises presenting the contents-of-interest includes displaying the contents-of-interest on a display.

4. The method of claim 1, wherein the contents-of-interest include audio content, and wherein the method further comprises presenting the contents-of-interest includes presenting the contents-of-interest on speakers.

5. The method of claim 1, wherein the communication input system comprises a satellite dish, wherein the program is received from a satellite transmission system, and wherein the data storage system and the presentation output interface are combined in a set-top box.

6. The method of claim 1, wherein the selected marker set comprises a first marker set, the first marker set including a first plurality of markers indicating first contents-of-interest in the program, wherein the presentation output interface presents the first contents-of-interest on the user interface according to the first plurality of markers in the first marker set in response to first requests to present the first contents-of-interest, and wherein the method further comprises:

receiving, via user controls, a second selection of a second marker set from the plurality of marker sets for the program, the second marker set including a second plurality of markers indicating second contents-of-interest in the program;

receiving, via user controls, second requests to present the second contents-of-interest indicated by the second plurality of markers in the second marker set; and in response to the second requests to present the second contents-of-interest:

determining the locations of the second contents-of-interest in the program from the second plurality of markers in the second marker set; and presenting, via the presentation output interface, the second contents-of-interest on the user interface according to the second plurality of markers in the second marker set.

7. The method of claim 6, wherein the first contents-of-interest include the second contents-of-interest, the second plurality of markers indicating the at least some of the second contents-of-interest are located within the first contents-of-interest.

8. A receiving system for processing content in a program, the system comprising:

a processing system including a processor; and a memory that stores executable instructions that, when executed by the processing system, facilitate performance of operations, comprising:

receiving program and marker files, the program having a total duration based on the program being presented on a user interface in an entirety of the program, and the marker files including a plurality of marker sets for the program, each marker set including a respective plurality of markers indicating locations of contents-of-interest in the program, wherein the contents-of-interest include a first action of a first actor displayed in video images in the program and a second action of a second actor displayed in video images in the program, wherein the second action is a response to the first action in a previous contents-of-interest location in the program;

storing the program as the program is received to store the marker files, wherein the program is stored in a program data file including metadata, wherein the metadata provides elapsed time from a beginning of the program, wherein each marker refers to the elapsed time marking a start of the respective contents-of-interest in the program, wherein the respective plurality of markers in each marker set provides information relating to the metadata corresponding to the contents-of-interest, wherein the contents-of-interest include images from the program that take place during a predetermined time period as a clock in the program is winding down to zero, and wherein the information provided specifies a start time of the clock;

receiving a selection of one of the plurality of marker sets for the program as a selected marker set and requesting to present the contents-of-interest indicated by the respective plurality of markers in the selected marker set;

determining the locations of the contents-of-interest in the program from the respective plurality of markers in the selected marker set; and presenting the contents-of-interest on the user interface according to the respective plurality of markers in the selected marker set, wherein the presentation of the contents-of-interest skips some content in the program, and the contentsof-interest are presented over a shortened duration that is less that the total duration of the program as presented in the entirety of the program, and wherein the presenting the contents-of-interest includes locating the contents-of-interest in the program data file according to the information relating to the metadata and reading the contents-of-interest from the program data file for presentation on the user interface.

9. The system of claim 8, wherein the operations further comprise locating the contents-of-interest in the program data file according to the information relating to the metadata and read the contents-of-interest from the program data file for presentation on the user interface.

10. The system of claim 8, wherein the operations further comprise transmitting a request for the marker files, wherein the marker files is received in response to the request for the marker file.

11. The system of claim 8, wherein the contents-of-interest include visual content, and the user interface includes a display for presenting the contents-of-interest.

12. The system of claim 8, wherein the contents-of-interest includes audio content, and the user interface includes speakers for presenting the contents-of-interest.

13. The system of claim 8, further comprising a satellite dish, and wherein the program is received from a satellite transmission system via the satellite dish.

14. The system of claim 8, wherein the selected marker set is a first marker set, the first marker set includes a first plurality of markers indicating first contents-of-interest in the program, and wherein the presenting the contents-of-interest on the user interface comprises presenting the first contents-of-interest on the user interface according to the first plurality of markers in the first marker set in response to first requests to present the first contents-of-interest,
wherein the user interface is further configured to receive:
a second selection of a second marker set from the plurality of marker sets for the program, the second marker set including a second plurality of markers indicating second contents-of-interest in the program; and
second requests to present the second contents-of-interest indicated by the second plurality of markers in the second marker set, and
wherein the operations further comprise:
determining the locations of the second contents-of-interest in the program from the second plurality of markers in the second marker set; and
presenting the second contents-of-interest on the user interface according to the second plurality of markers in the second marker set.

15. The system of claim 14, wherein the first contents-of-interest include at least some of the second contents-of-interest, the second plurality of markers indicating the at least some of the second contents-of-interest are located within the first contents-of-interest.

16. A non-transitory machine-readable storage medium, comprising executable instructions that, when executed by a processing system including a processor, facilitate performance of operations, comprising:
providing a program and marker files from content sources, the program having a total duration based on the program being presented on a user interface in an entirety of the program, and the marker files including a plurality of marker sets for the program, each marker set including a respective plurality of markers indicating locations of contents-of-interest in the program, wherein the contents-of-interest include a first action of a first actor displayed in video images in the program and a second action of a second actor displayed in video images in the program, wherein the second action is a response to the first action in a previous contents-of-interest portion of the program;
receiving the program and the marker files from the content sources;
storing the program and the marker files, wherein the program is stored in a program data file including metadata, and presenting the contents-of-interest includes locating the contents-of-interest in the program data file according to the information relating to the metadata and reading the contents-of-interest from the program data file for presentation on the user interface, and wherein the metadata provides an elapsed time from a beginning of the program, and wherein each marker of the plurality of markers refers to the elapsed time marking a start of respective content of interest in the program;
determining a selection of one of the plurality of marker sets as a selected marker set and determining the locations of the contents-of-interest in the program from the respective plurality of markers in the selected marker set, wherein the respective plurality of markers in each marker set provides information relating to the metadata corresponding to the contents-of-interest;
presenting, on the user interface, the contents-of-interest on a user interface according to the respective plurality of markers in the selected marker set, the presentation of the contents-of-interest skipping some content in the program, and the contents-of-interest being presented over a shortened duration that is less that the total duration of the program as presented in the entirety of the program, and wherein the presenting the contents-of-interest includes locating the contents-of-interest in the program data file according to the information relating to the metadata and reading the contents-of-interest from the program data file for presentation on the user interface; and
providing, on the user interface, a set marker control to add a marker to the selected marker set, wherein the marker specifies a point at a predetermined time period in the program before activation of the set marker control.

17. The non-transitory machine-readable storage medium of claim 16, wherein the content source comprises a satellite transmission system.

* * * * *